United States Patent
Zhou

(10) Patent No.: US 8,534,531 B1
(45) Date of Patent: Sep. 17, 2013

(54) ELECTRIC SOLDERING IRON

(71) Applicants: Hong Fu Jin Precision Industry (ShenZhen) Co., Ltd., Shenzhen (CN); Hon Hai Precision Industry Co., Ltd., New Taipei (TW)

(72) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,256

(22) Filed: Dec. 24, 2012

(30) Foreign Application Priority Data

Apr. 18, 2012 (CN) .......................... 2012 1 0114076

(51) Int. Cl.
 *B23K 3/02* (2006.01)
(52) U.S. Cl.
 USPC ................. 228/8; 228/51; 228/102; 228/103; 219/229
(58) Field of Classification Search
 None
 See application file for complete search history.

(56) References Cited

U.S. PATENT DOCUMENTS

| | | | | |
|---|---|---|---|---|
| 2,955,187 A * | 10/1960 | Campo | ......................... | 228/20.5 |
| 3,690,539 A * | 9/1972 | Geiger et al. | ................. | 228/20.5 |
| 4,056,334 A * | 11/1977 | Fortune | ........................... | 417/189 |
| 4,574,994 A * | 3/1986 | Rauchwerger | ................ | 228/20.5 |
| 4,607,151 A * | 8/1986 | Kihlstrom | ...................... | 219/230 |
| 4,796,795 A * | 1/1989 | Urban | ........................... | 228/20.5 |
| 4,868,369 A * | 9/1989 | Chen | .............................. | 219/242 |
| 4,887,759 A * | 12/1989 | Alexander | ..................... | 228/20.5 |
| 5,048,742 A * | 9/1991 | Fortune | ........................... | 228/20.5 |
| 5,080,277 A * | 1/1992 | Diaconu et al. | .................. | 228/42 |
| 5,113,750 A * | 5/1992 | Sherman | ........................... | 454/63 |
| 5,280,851 A * | 1/1994 | Neukum | ....................... | 228/20.5 |
| 5,299,725 A * | 4/1994 | Eisele et al. | .................. | 228/20.1 |
| 5,524,809 A * | 6/1996 | Kosslow et al. | .............. | 228/20.5 |
| 5,605,276 A * | 2/1997 | Nagata | ........................... | 228/257 |
| 5,681,364 A * | 10/1997 | Fortune | ........................... | 55/400 |
| 5,683,603 A * | 11/1997 | Fortune | ........................... | 219/229 |
| 6,633,021 B2 * | 10/2003 | Matubara | ...................... | 219/229 |
| 2005/0218197 A1* | 10/2005 | Mochizuki | ..................... | 228/264 |

FOREIGN PATENT DOCUMENTS

| | | | | |
|---|---|---|---|---|
| EP | 145248 A | * | 6/1985 | |
| GB | 205761 A | * | 2/1981 | |
| JP | 53-100151 A | * | 9/1978 | |
| JP | 60-177959 A | * | 9/1985 | |
| JP | 01-053766 A | * | 3/1989 | |
| JP | 03-230863 A | * | 10/1991 | |
| JP | 04-135060 A | * | 5/1992 | |

(Continued)

*Primary Examiner* — Kiley Stoner
(74) *Attorney, Agent, or Firm* — Altis Law Group, Inc.

(57) ABSTRACT

An electric soldering iron includes a soldering iron head, a sensor, a control unit, an air suction fan, a filtering unit, and an output unit. The control unit is connected to the sensor, the air suction fan, the filtering unit, and the output unit. The air suction fan is connected to the output unit through the filtering unit. The soldering iron head can be used to melt rosin and solder. When the sensor detects there is smoke near the soldering iron head, the sensor outputs a signal to the control unit. The control unit controls the air suction fan, the filtering unit, and the output unit to operate according to the signal. The air suction fan draws the smoke in and outputs the smoke to the filtering unit. The filtering unit filters harmful ingredients from the smoke. The output unit outputs the filtered smoke.

7 Claims, 2 Drawing Sheets

(56) References Cited

FOREIGN PATENT DOCUMENTS

| | | | | |
|---|---|---|---|---|
| JP | 09-308963 | A | * | 12/1997 |
| JP | 2000-061630 | A | * | 2/2000 |
| JP | 2006-281277 | A | * | 10/2006 |
| JP | 2012-024798 | A | * | 2/2012 |
| KR | 2002-065975 | A | * | 8/2002 |
| KR | 2003-096916 | A | * | 12/2003 |

* cited by examiner

ELECTRIC SOLDERING IRON

BACKGROUND

1. Technical Field

The present disclosure relates to an electric soldering iron.

2. Description of Related Art

Electric soldering irons are widely used in production, testing, and maintenance of electronic products. However, when soldering irons are used to melt rosin and solder, unpleasant and toxic smoke is generated, which is harmful for an operator.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one".

Figure 1:
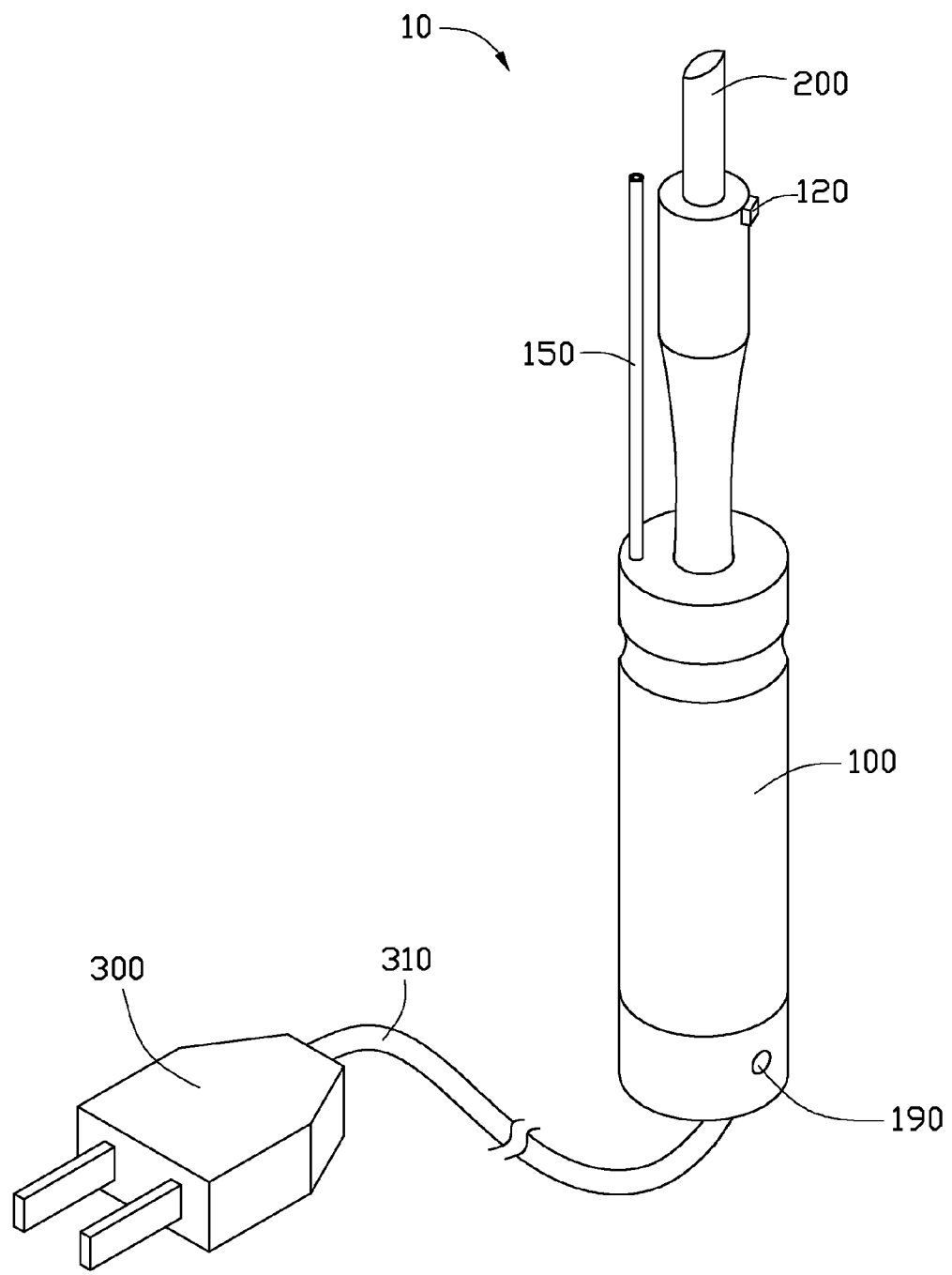
FIG. 1 is a schematic view of an electric soldering iron in accordance with an embodiment of the present disclosure.
Figure 2:
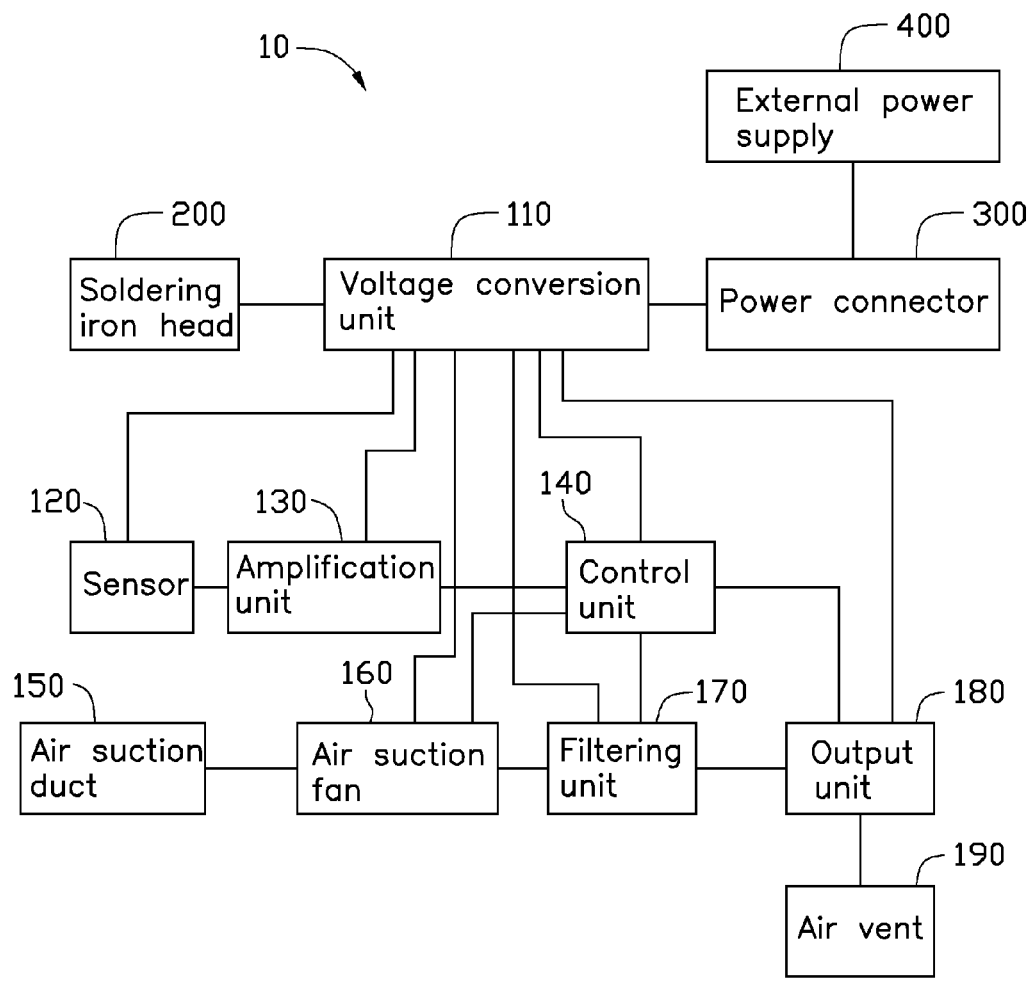
FIG. 2 is a block diagram of the electric soldering iron of FIG. 1.

FIGS. 1 and 2 show an embodiment of an electric soldering iron 10. The electric soldering iron 10 includes a main body 100, a voltage conversion unit 110, a sensor 120, an amplification unit 130, a control unit 140, an air suction duct 150, an air suction fan 160, a filtering unit 170, an output unit 180, an air vent 190, a soldering iron head 200, and a power connector 300. The soldering iron head 200 extends from a front end of the main body 100. The power connector 300 is connected to the main body 100 by a cable 310. The sensor 120 is positioned on the front end of the main body 100. The suction duct 150 is positioned on the main body 100. The suction duct 150 includes an air inlet close to the soldering iron head 200. The voltage conversion unit 110, the amplification unit 130, the control unit 140, the air suction fan 160, the filtering unit 170, and the output unit 180 are all received in the main body 100. The air vent 190 is defined in the main body 100.

The voltage conversion unit 110 is connected to the sensor 120, the amplification unit 130, the control unit 140, the air suction fan 160, the filtering unit 170, the output unit 180, the soldering iron head 200, and the power connector 300. The sensor 120 is connected to the amplification unit 130. The control unit 140 is connected to the amplification unit 130, the air suction fan 160, the filtering unit 170, and the output unit 180. The suction duct 150 is connected to the air suction fan 160. The filtering unit 170 is connected to the air suction fan 160 and the output unit 180. The output unit 180 is connected to the air vent 190.

The power connector 300 is used to connect to an external power supply 400, such as commercial power, to provide power to the voltage conversion unit 110 through the cable 310. The voltage conversion unit 110 is used to convert voltage of the external power supply 400 to operation voltages for the sensor 120, the amplification unit 130, the control unit 140, the air suction fan 160, the filtering unit 170, the output unit 180, and the soldering iron head 200. The soldering iron head 200 is used to melt rosin and solder. The sensor 120 is used to detect whether there is smoke near the soldering iron head 200, and output signals to the amplification unit 130 according to the detection result. The amplification unit 130 is used to amplify the signals received from the sensor 120 and output the amplified signals to the control unit 140. The control unit 40 is used to control the air suction fan 160, the filtering unit 170, and the output unit 180 to operate or not, according to the amplified signals received from the amplification unit 130. The air suction fan 160 is used to draw smoke near the soldering iron head 200 through the suction duct 150, and output the smoke to the filtering unit 170. The filtering unit 170 is used to filter harmful ingredients from the smoke. The output unit 180 is used to output the filtered smoke through the air vent 190.

In use, when the sensor 120 detects that there is smoke near the soldering iron head 200, the sensor 120 outputs a first signal to the amplification unit 130. The amplification unit 130 amplifies the first signal, and outputs the amplified first signal to the control unit 140. The control unit 140 controls the air suction fan 160, the filtering unit 170, and the output unit 180 to operate, according to the amplified first signal. The air suction fan 160 draws smoke from near the soldering iron head 200 through the suction duct 150 to the filtering unit 170. The filtering unit 170 filters harmful ingredients from the smoke. The output unit 180 outputs the filtered smoke through the air vent 190.

When the sensor 120 detects that there is no smoke near the soldering iron head 200, the sensor 120 outputs a second signal to the amplification unit 130. The amplification unit 130 amplifies the second signal, and outputs the amplified second signal to the control unit 140. The control unit 140 controls the air suction fan 160, the filtering unit 170, and the output unit 180 not to operate, according to the amplified second signal. Therefore, energy is saved.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electric soldering iron, comprising:
    a soldering iron head;
    a control unit;
    a sensor connected to the control unit, the sensor to detect whether there is smoke near the soldering iron head, and output signals to the control unit according to the detection result;
    an air suction fan connected to the control unit;
    a filtering unit connected to the control unit and the air suction fan; and
    an output unit connected to the control unit and the filtering unit;
    wherein the sensor outputs a first signal to the control unit, in response to the sensor detecting there is smoke near the soldering iron head, the control unit controls the air suction fan, the filtering unit, and the output unit to operate according to the first signal, the air suction fan draws the smoke in and outputs the smoke to the filtering unit, the filtering unit filters harmful ingredients from the smoke, and the output unit outputs the filtered smoke.

2. The electric soldering iron of claim 1, wherein the sensor outputs a second signal to the control unit, in response to the sensor detecting there is no smoke near the soldering iron head; the control unit controls the air suction fan, the filtering unit, and the output unit not to operate according to the second signal.

3. The electric soldering iron of claim 2, further comprising an amplification unit, wherein the sensor is connected to the control unit through the amplification unit, the amplification unit amplifies the first and second signals received from the sensor, and outputs the amplified first and second signals to the control unit, the control unit controls the air suction fan, the filtering unit, and the output unit according to the amplified first and second signals.

4. The electric soldering iron of claim 3, further comprising a power connector and a voltage conversion unit, wherein the power connector connects to an external power supply and the voltage conversion unit, to provide power to the voltage conversion unit, the voltage conversion unit converts voltage of the external power supply to operation voltages for the sensor, the amplification unit, the control unit, the air suction fan, the filtering unit, the output unit, and the soldering iron head.

5. The electric soldering iron of claim 3, further comprising a main body, wherein the soldering iron head extends from a front end of the main body, the sensor is positioned on the front end of the main body, the voltage conversion unit, the amplification unit, the control unit, the air suction fan, the filtering unit, and the output unit are all received in the main body.

6. The electric soldering iron of claim 5, wherein the main body comprises a suction duct comprising an air inlet close to the soldering iron head, the suction duct is connected to the air suction fan, the air suction fan draws the smoke through the suction duct.

7. The electric soldering iron of claim 5, wherein the main body defines an air vent, the output unit outputs the filtered smoke through the air vent.

* * * * *